United States Patent
Maillard et al.

(10) Patent No.: US 6,578,353 B2
(45) Date of Patent: Jun. 17, 2003

(54) HYDROMECHANICAL SYSTEM FOR LIMITING EXCESS ENGINE SPEED

(75) Inventors: David Maillard, Bois le Roi (FR); Alain Garassino, Crisenoy (FR); Claude Maillard, Vulaines sur Seine (FR); Caroline Dessenne, Chatillon (FR); Isabelle Vegiotti, Corbeil Essonnes (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 09/912,541

(22) Filed: Jul. 26, 2001

(65) Prior Publication Data

US 2002/0078693 A1 Jun. 27, 2002

(30) Foreign Application Priority Data

Dec. 22, 2000 (FR) .............................. 00 16899
Apr. 24, 2001 (FR) .............................. 01 05475

(51) Int. Cl.[7] .................................. F02C 9/28
(52) U.S. Cl. ................................... 60/39.281
(58) Field of Search ...................... 60/39.281

(56) References Cited

U.S. PATENT DOCUMENTS 2,688,229 A * 9/1954 Lee, II ................... 60/39.281
3,050,941 A * 8/1962 Rogers .................. 60/39.281
4,602,479 A 7/1986 Hansen
4,716,723 A * 1/1988 Ralston et al. .......... 60/39.281
4,817,376 A 4/1989 Brocard et al.
5,927,064 A * 7/1999 Dyer et al. ............. 60/39.281

FOREIGN PATENT DOCUMENTS

EP     0 915 241     5/1999

* cited by examiner

Primary Examiner—Michael Koczo
(74) Attorney, Agent, or Firm—Oblon, Spivak, McClelland, Maier & Neustadt, P.C.

(57) ABSTRACT

In a turbomachine whose speed of rotation is controlled by means of a throttle control lever acting via an electronic control circuit, a system is provided to provide protection against excess speed, the system comprising means for limiting the fuel feed of the turbomachine to a predetermined fixed flow rate Wps when the speed of rotation exceeds an authorized maximum speed, means for maintaining said fuel feed at said predetermined fixed flow rate while the speed of rotation drops below the authorized maximum speed, and means for reducing said fuel speed to a flow rate Wr corresponding to an idling speed when the throttle control lever issues an idling control to the turbomachine via the electronic control circuit.

8 Claims, 8 Drawing Sheets

HYDROMECHANICAL SYSTEM FOR LIMITING EXCESS ENGINE SPEED

FIELD OF THE INVENTION

The present invention relates to the field of injecting fuel into turbomachines, and it relates more particularly to a system for protecting against excess speed.

PRIOR ART

In turbomachines, best performance is obtained at speeds of rotation of the rotary members that are close to the maximum acceptable limits, beyond which a compressor or turbine blade might be lost. Unfortunately, such a loss is likely to perforate the engine casing with consequences that can be as bad as complete destruction of the turbomachine.

Thus, and as recommended by international regulations concerning civil aviation, it is essential to use a system to provide protection against excess speeds so as to ensure that the speed of said rotary members does not exceed such authorized maximum speeds.

Until recently, these protection systems made use of regulators of the same type as the Watt fly-weight governor, as shown in international application No. WO 89/02980. However, nowadays, such mechanical regulators are being replaced progressively by electronic regulators which act directly on the engine by interrupting the fuel supply to the combustion chamber of the turbomachine. An example of one such present-day architecture is described in international application No. WO 99/00585.

Unfortunately, that solution suffers from the severe drawback of requiring a restart procedure to be engaged subsequently which, under certain particular conditions of flight, e.g. takeoff, can turn out to be impossible to implement and can lead inevitably to loss of the aircraft.

OBJECT AND DEFINITION OF THE INVENTION

The present invention thus proposes mitigating those drawbacks by means of an electronic system for providing protection against excess speeds which does not lead to the engine being completely stopped, and which also guarantees a minimum operating speed for maintaining all of the equipment of the aircraft. Another object of the invention is to enable the pilot to act directly on the system in order to unlock it and thus restore the engine to operability.

These objects are achieved by a protection system for providing a turbomachine with protection against excess speed, in which machine the speed of rotation is controlled by a throttle control lever acting via an electronic control circuit, the system comprising means for limiting the fuel feed of said turbomachine to a predetermined fixed flow rate Wps when said speed of rotation exceeds an authorized maximum speed, means for maintaining this fuel feed at said predetermined fixed flow rate while said speed of rotation drops below said authorized maximum speed, and means for returning said fuel speed to a flow rate Wr corresponding to an idling speed when said throttle control lever issues an idling command to said turbomachine via said electronic control circuit.

With the present invention, in the event of excess speed, fuel feed to the engine is reduced to a predetermined fixed fuel feed rate Wps and it is held at this feed rate value until the speed of rotation of the engine slows to less than a predetermined speed, protection subsequently being lifted by the pilot of the aircraft returning the throttle lever to a position Wr for causing the engine to idle.

Preferably, the means for limiting the fuel feed to a predetermined fixed flow rate Wps comprise an electronic circuit for detecting excess speed and producing an electrical signal (I) whenever the speed of rotation (N) of the turbomachine exceeds an authorized maximum speed (N_LIMIT), an excess speed solenoid valve connected to said electronic circuit for detecting excess speed and delivering a first hydraulic signal (Px1) under the control of said electrical signal, and an excess speed valve whose position is controlled by said first hydraulic signal to act by means of a metering valve to which it is connected so as to cause the flow rate of fuel injected into said turbomachine to decrease until the rate reaches said predetermined fixed rate Wps. Depending on the embodiment used, said predetermined fixed flow rate Wps is delivered either by a utilization outlet of said metering valve or by a utilization orifice of said excess speed valve.

The first hydraulic signal corresponds to a low pressure Pb when said speed of rotation of the turbomachine is less than said authorized maximum speed, and to a higher pressure Psf when said speed of rotation (N) exceeds said authorized maximum speed (N_LIMIT). Preferably, said higher pressure Psf is equal to a high pressure P1 available at the outlet from a high pressure fuel injection pump.

In an advantageous embodiment, said predetermined fixed flow rate is maintained while said speed of rotation of the turbomachine drops below said authorized maximum speed by means of a second hydraulic signal (Px2) set to said higher pressure Psf and added to said first hydraulic signal so as to move a hydraulic slider of said excess speed valve against a spring. Said second hydraulic signal is obtained from a hydraulic control signal (Px0) generated via said metering valve from said higher pressure Psf.

The present invention also relates to the method implemented in the above-specified system for providing protection against excess speeds.

BRIEF DESCRIPTION OF THE DRAWINGS

The characteristics and advantages of the present invention will appear better on reading the following description given by way of non-limiting indication and with reference to the accompanying drawings, in which.

DETAILED DESCRIPTION OF A PREFERRED EMBODIMENT

Figure 1A:
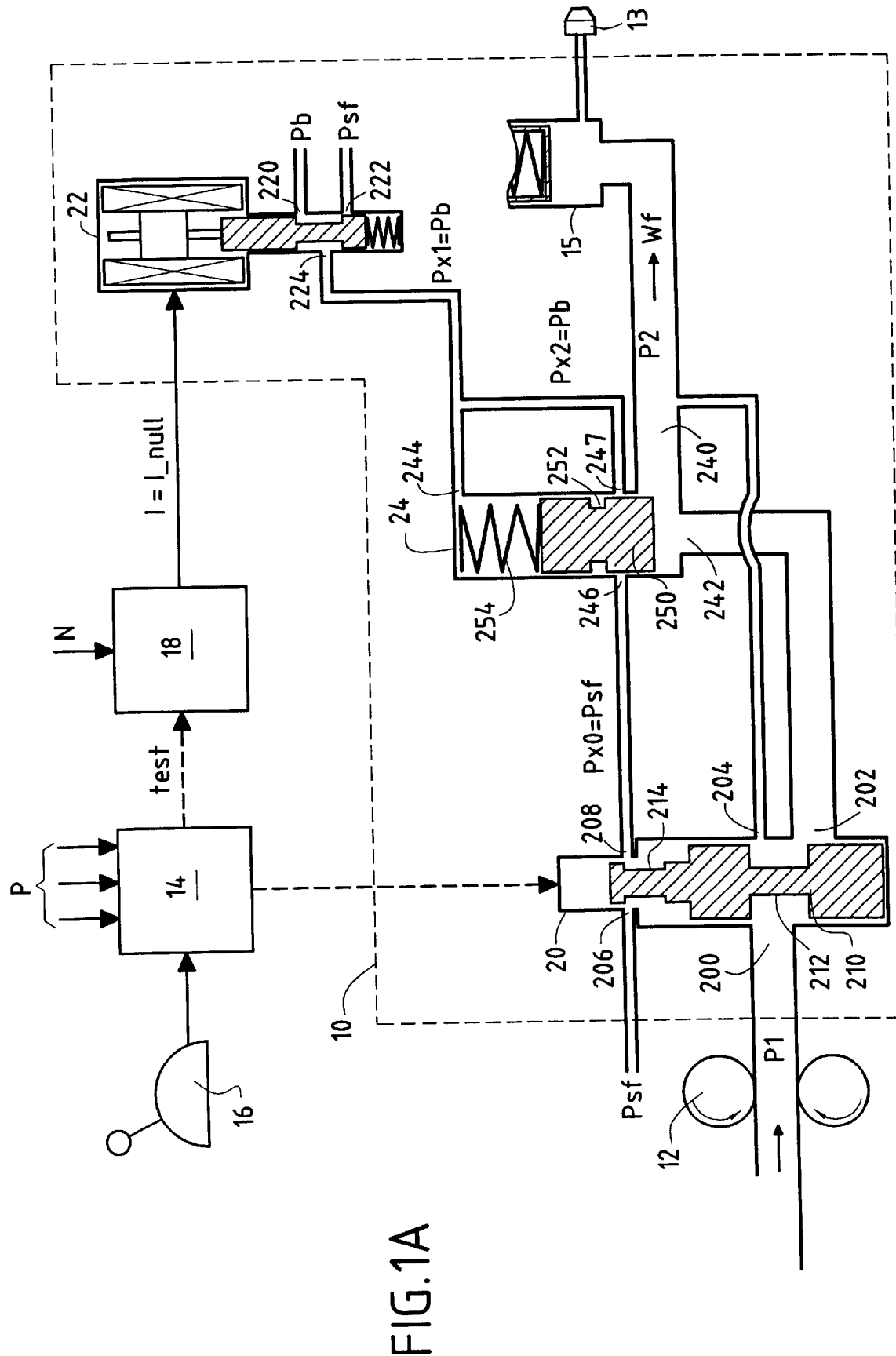
FIGS. 1A and 1B are fragmentary diagrammatic views of two embodiments of a fuel injection system for a turbomachine provided with a system of the invention for providing protection against excess speeds.
Figure 1B:
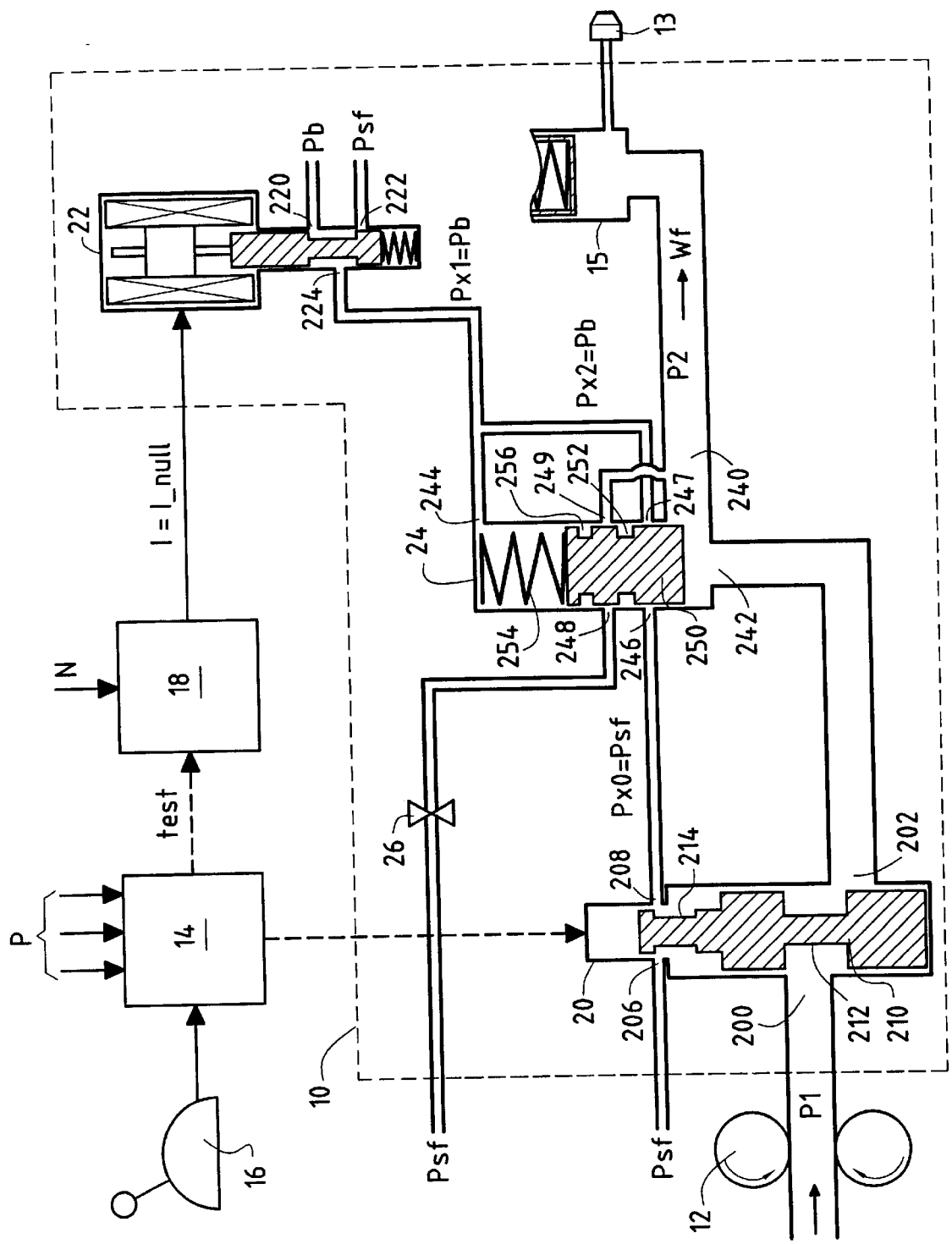

A diagrammatic view of a portion of a fuel injection system for an aircraft turbomachine is shown in FIGS. 1A and 1B.

In general, such a fuel injection system is organized around a fuel metering unit (FMU) 10 for controlling the flow rate of fuel that flows between a high pressure pump 12 for pressurizing the fuel taken from a fuel tank (not shown) and a plurality of fuel injectors 13 for the combustion chamber of said turbomachine at the inlets of which there are disposed respective shut-off valves 15 controlled by corresponding shut-off solenoid valves. The high pressure HP at the outlet from the high pressure pump is referenced P1 and the pressure at the inlet to the injectors is referenced P2. The fuel flow rate supplied by the metering unit (engine regulation) is continuously controlled by an electronic control circuit 14 to which said unit is connected, said control being a function of engine parameters P and of the position of a throttle control lever 16 actuated by the pilot of the aircraft.

The metering unit essentially comprises: a fuel metering valve (FMV) 20 having a first fuel feed inlet 200 connected to the outlet of the high pressure pump 12; an excess speed solenoid valve 22 having a first inlet 220 connected to a low pressure Pb and a second inlet 222 connected to a high pressure Psf; and an excess speed valve 24 having a pilot output 240 connected to the injectors, a first end inlet 242 of said valve (at the rear face of the valve) being connected to a first utilization outlet (metering orifice 202) of the metering valve 20, and a second end inlet 244, opposite from the first end inlet, being connected to an outlet 224 of the excess speed solenoid valve.

The fuel metering valve 20 includes a hydraulic slider 210 which can move linearly under the control of the electronic control circuit 14. The slider has two annular slots 212 and 214. The first slot 212 is for metering fuel (defining the metered flow rate for the engine) which is received via the first feed inlet 200 and is delivered via the first utilization outlet 202. The second slot 214 provides communication between a second feed inlet 206 connected to the high pressure Psf (which advantageously corresponds to the outlet pressure from the high pressure pump), and a second utilization outlet 208 connected to a first feed orifice 246 of the excess speed valve 24, which valve includes a hydraulic slider 250 having a first annular slot 252 serving to establish communication with a first utilization orifice 247 looped back onto the second end inlet 244 and thus also connected to the outlet 224 from the excess speed solenoid valve 22. The position of the excess speed valve 24 is controlled by referring a spring 254 to a hydraulic signal. Thus, the excess speed valve is closed by applying a hydraulic signal equal to Psf to its second end inlet 244 which signal is then combined with the action of the spring 254. When the hydraulic signal disappears, its value becomes Pb and the action of the pressure P2 downstream from the metering valve 20 becomes greater than the force exerted by the spring when it is referenced to Pb, so the excess speed valve opens.

The excess speed solenoid valve 22 is controlled by an electronic circuit 18 for detecting excess speed which has the function of responding in particular to information from a sensor for detecting the speed of rotation (N) of the high pressure body, such as rotary members, of the turbomachine to detect when this HP body reaches the limit speed (N_LIMIT). Thus, if the speed of the HP body is greater than said limit and remains greater than said limit, then the electronic circuit 18 for detecting excess speed must produce an electrical control signal (I) which acts via the solenoid valve 22 to generate a first hydraulic signal (Px1) to cause the excess speed valve 24 to close.

In a first embodiment as shown in FIG. 1A, the fuel metering valve 20 also has a third utilization outlet 204 connected directly to the pilot outlet 240 of the excess speed valve 24 at the inlet to the injectors and designed to deliver a stabilized "excess speed protection" fuel rate of predetermined fixed value Wps which corresponds to a flow rate that is close to (and preferably slightly greater than) the rate required for idling. In an alternative second embodiment, this excess speed flow rate Wps delivered to the injectors is not obtained from the fuel metering valve but via the excess speed valve 24 using a second slot 252 of its hydraulic slider 250 which then includes both a second feed orifice 248 connected to the high pressure Psf via a diaphragm 26 calibrated to obtain the excess speed flow rate (possibly being integrated in the orifices of the excess speed valve), and secondly a second utilization orifice 249 connected directly to the pilot outlet 240 of the excess speed valve 24 at the inlet to the injectors (see FIG. 1B).

For simplification purposes, those elements of the injection system which do not contribute directly to the invention have deliberately been omitted even though they must naturally appear in any injection system. This applies, for example, to the "bypass" type valve looped around the HP pump to recycle the excess fuel it delivers and any conventional pressurization valves or indeed any above-mentioned shut-off solenoid valves.

The injection system modified by the invention is based on the principle that in normal operation the position of the pilot's throttle lever (TLA) corresponds to the position of the hydraulic component of the fuel metering valve (FMV) feeding the injectors. Thus, after excess speed has been detected, if the position of the fuel metering valve responds as it should to the setting of the throttle lever (manual action), it can be assumed that the engine control system (and in particular the electronic control circuit) between the throttle lever and the metering valve is not responsible for the excess speed.

The system of the invention for providing protection against excess speed proposes storing the excess speed protection state hydraulically and deleting this record, likewise hydraulically, once the metering valve has returned to a position controlled manually by the pilot using the throttle lever. The hydraulic control signal (Px0) which locks and unlocks the excess speed valve 24 (by supplying the flow necessary for locking purposes) is built around the position of the second slot 214 of the metering slider 210 relative to the second feed inlet 206 and the second utilization outlet 208, this slot putting them into communication with each other when the position of the metering valve is greater than or equal to the predetermined flow rate Wps for providing protection against excess speed. Under such circumstances, the hydraulic control signal (Px0) is equal to the high pressure (Psf). In contrast, if the position of the metering valve is less than said predetermined flow rate for providing protection against excess speed, then communication is interrupted and the hydraulic control signal (Px0) becomes zero (P_null).

Depending on the embodiment chosen, the operation of the system of the invention for providing protection against excess speed is described below with reference to FIGS. 2A to 4A or 2B to 4B.

Returning initially to FIGS. 1A and 1B the system is shown in its state corresponding to normal operation.

The turbomachine is then running at a speed faster than idling (set to deliver a determined flow rate to the engine) corresponding to a position of the slider 210 of the fuel metering valve which thus provides communication between its first feed inlet 200 and its first utilization outlet 202 (its second feed inlet 206 which is at the high pressure Psf also communicates via the second annular slot 214 of the metering valve slider 210 with the second utilization outlet 208, thereby putting the hydraulic control signal Px0 to Psf). The speed (N) of the HP body is below the threshold (N_LIMIT) that triggers excess speed protection, and the electronic circuit 18 for detecting excess speed does not deliver an electrical signal for triggering the protection action (I=I_null). The first hydraulic signal (Px1) output from the excess speed solenoid valve is in a rest position at the low pressure (Pb) corresponding to the excess speed valve 24 being open (deactivated). The states of the pressures are therefore as follows:

(Px1)=(Px2)=(Pb) and (Px0)=(Psf)

The excess speed valve 24 is kept open by the action of the pressure forces (P2) downstream from the metering valve 20. The fuel flow rate going to the injectors Wf is greater than the predetermined fixed flow rate Wps for providing protection against excess speed.

Figure 2A:
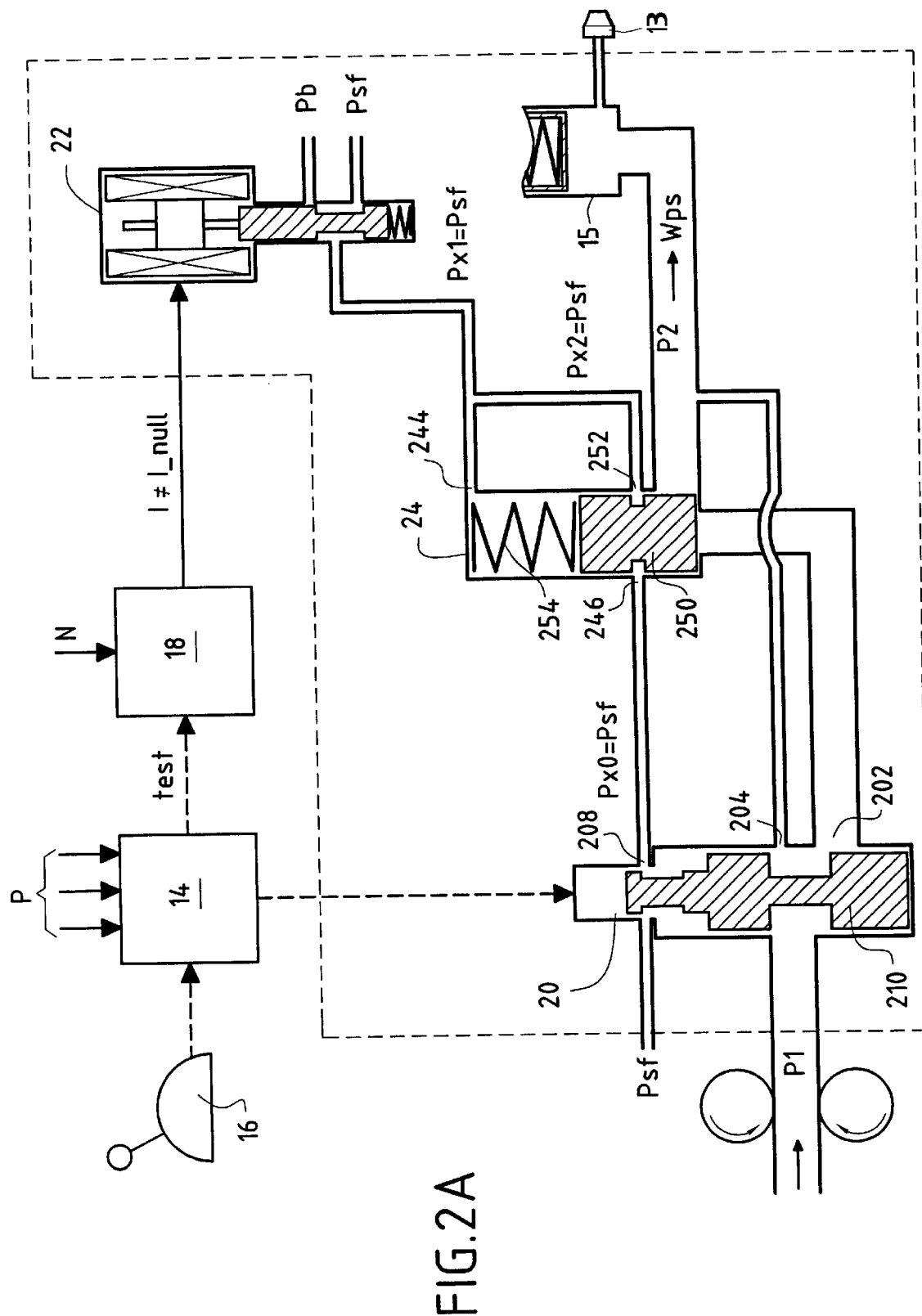
FIGS. 2A and 2B are views similar to that of FIGS. 1A and 1B, in a position in which excess speed is detected.
Figure 2B:
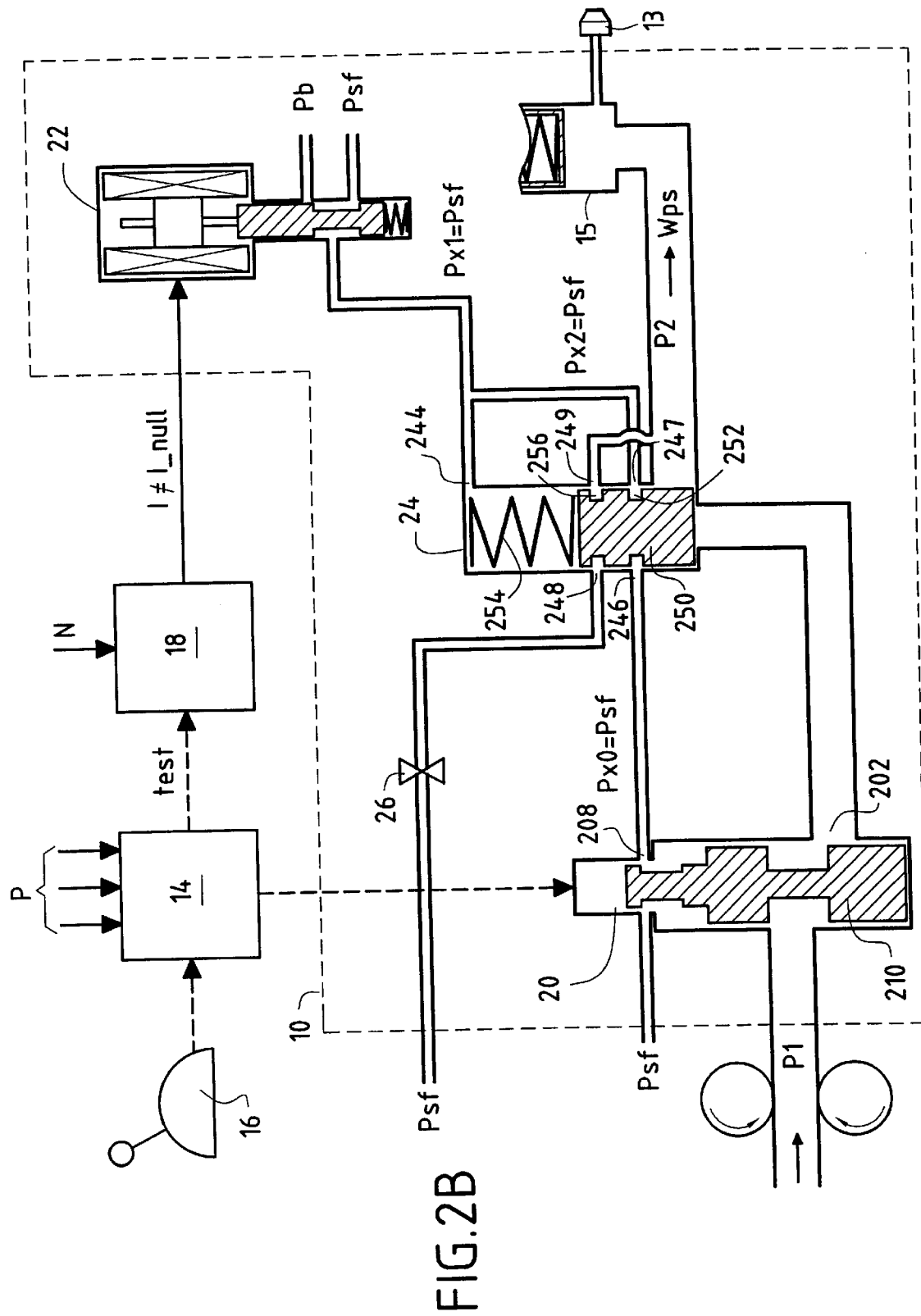

FIGS. 2A and 2B show the state of the injection system when excess speed has been detected.

From the above normal states, the HP body has started turning at excess speed, for reasons unknown. The electronic circuit 18 for detecting excess speed observes that the HP body is rotating faster than its predetermined limit (N_LIMIT) so it generates an electrical signal (I) that is different from the preceding rest state (I_null). This electrical signal acts as a signal for closing the solenoid valve 22 whose first outlet hydraulic signal (Px1) is then put to the high pressure (Psf). The action of the spring (K) in addition to the action of this pressure (Psf) on the rear face thereof has the effect of closing the excess speed valve 24. The fuel flow rate will then decrease down to its predetermined minimum value Wps, either via the third utilization outlet 204 of the metering valve 20 (Figure 2A) or via the second utilization orifice 249 of the excess speed valve 24 (Figure 2B), depending on the embodiment concerned. When the excess speed valve reaches its closed position (the first utilization outlet 202 then being completely shut off), the second utilization outlet 208 of the metering valve 20 and the first feed orifice 246 of the excess speed valve are put into communication via the first annular slot 252, generating a complementary hydraulic signal (Px2) which is applied to the spring side of the excess speed valve (its rear face) where it is added to the first hydraulic signal (Px1). The states of the pressures then becomes:

(Px1)=(Pxf) and (Px0)=(Ps2)=(Psf)

Figure 3A:
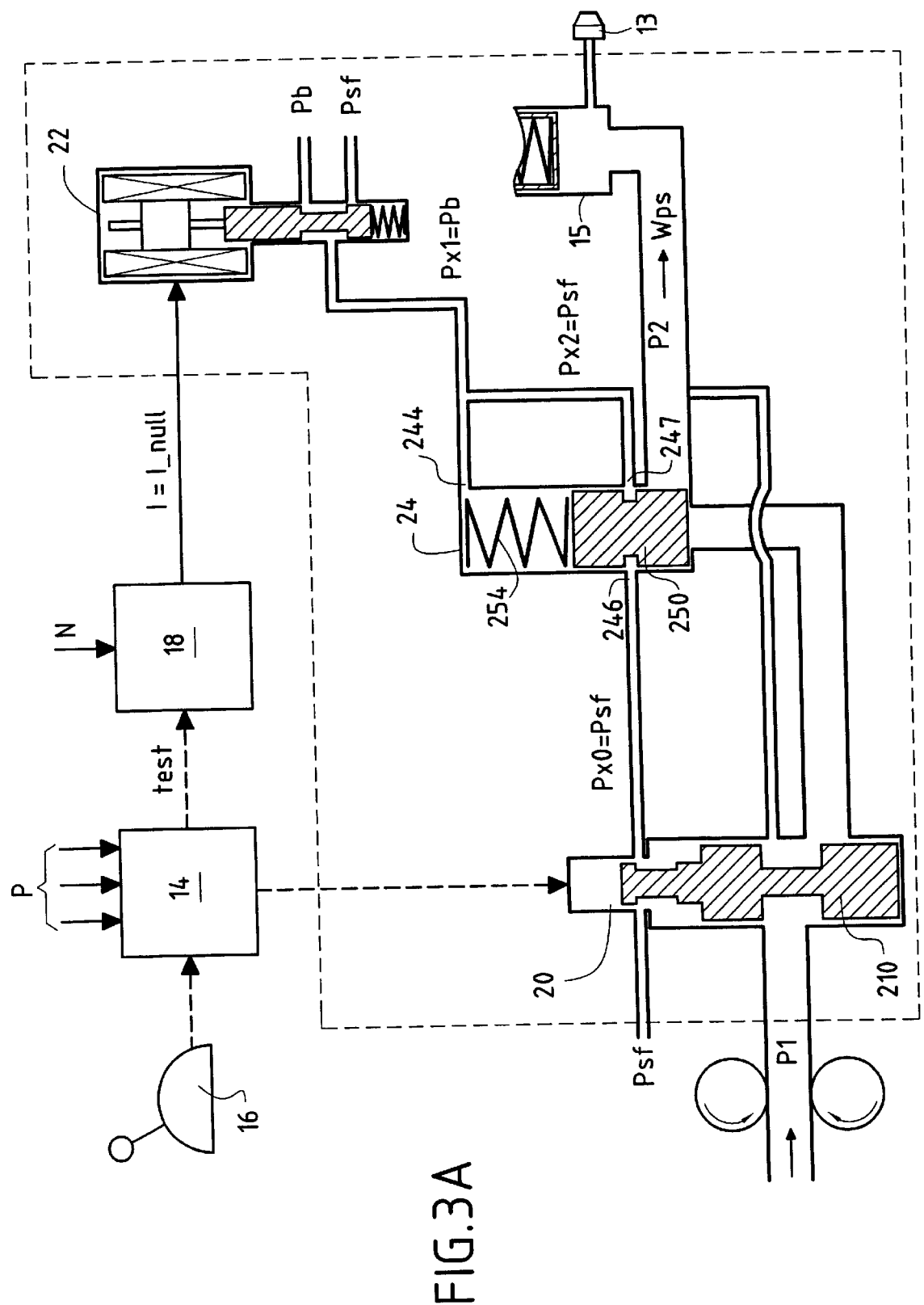
FIGS. 3A and 3B are views similar to that of FIGS. 1A and 1B, in a position in which protection is locked.
Figure 3B:
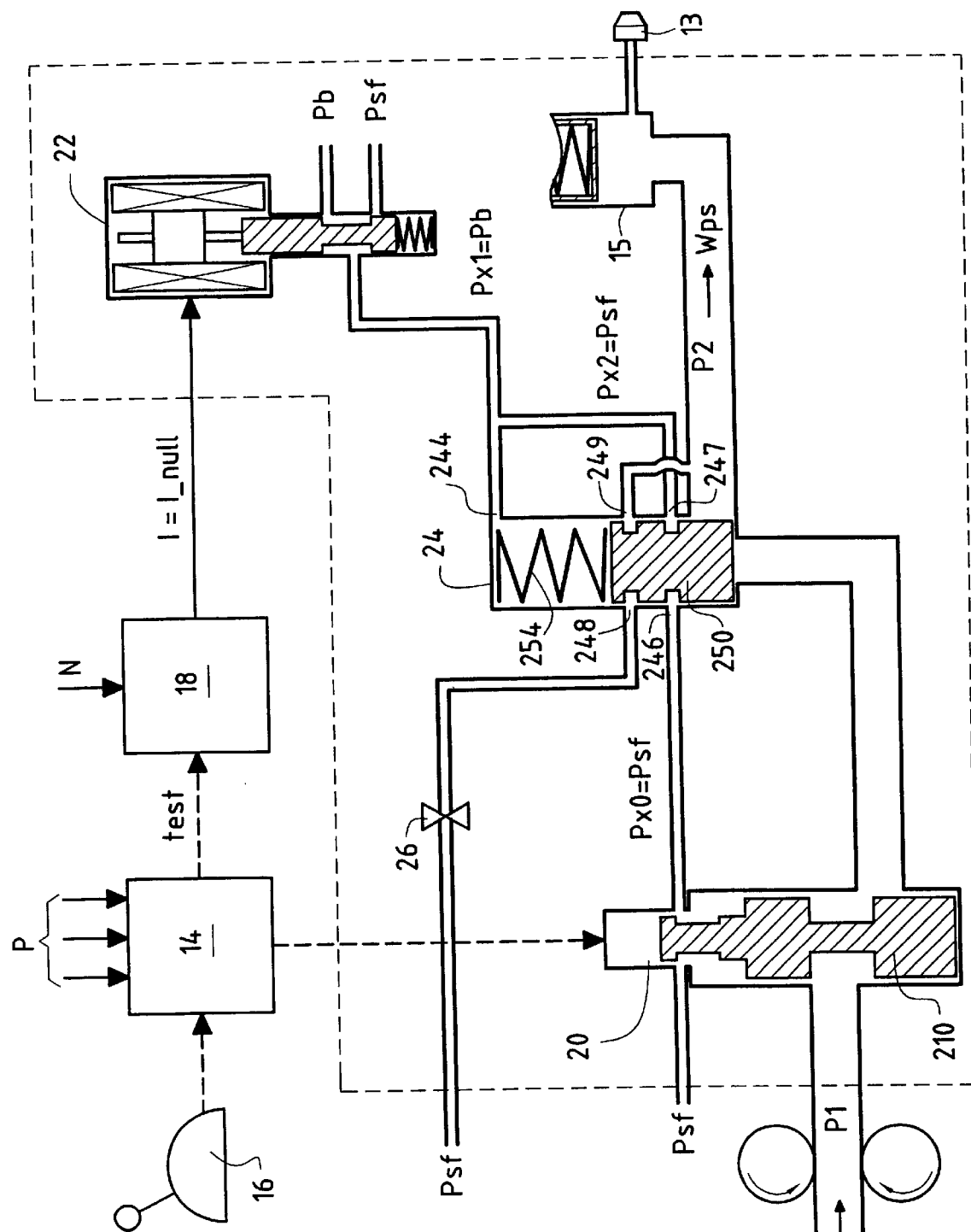

FIGS. 3A and 3B show the state of the injection system in a position after protection action has been locked.

The excess speed valve 24 is now closed and the flow rate sent to the injectors is saturated at the predetermined fixed value Wps corresponding to the excess speed flow rate, and the speed of the HP body decreases until it becomes less than the predefined limit (N_LIMIT). At this moment, the signal (I) becomes equal to its initial null value (I_null). This solenoid valve 22 is then deactivated, causing the signal (Px1) to switch back from (Psf) to (Pb), but (Px2) still remains equal to (Psf) (the spring 254 referenced to Psf makes it possible to keep the valve in its closed position) so long as the position of the metering valve remains greater than the fixed idling value, so the excess speed valve 24 is locked in its closed position and the turbomachine remains in its excess speed protection state with a flow rate equal to Wps. In this locked position, the states of the pressures are as follows:

(Px1)=(Pb) and (Px0)=(Px2)=(PSF)

Figure 4A:
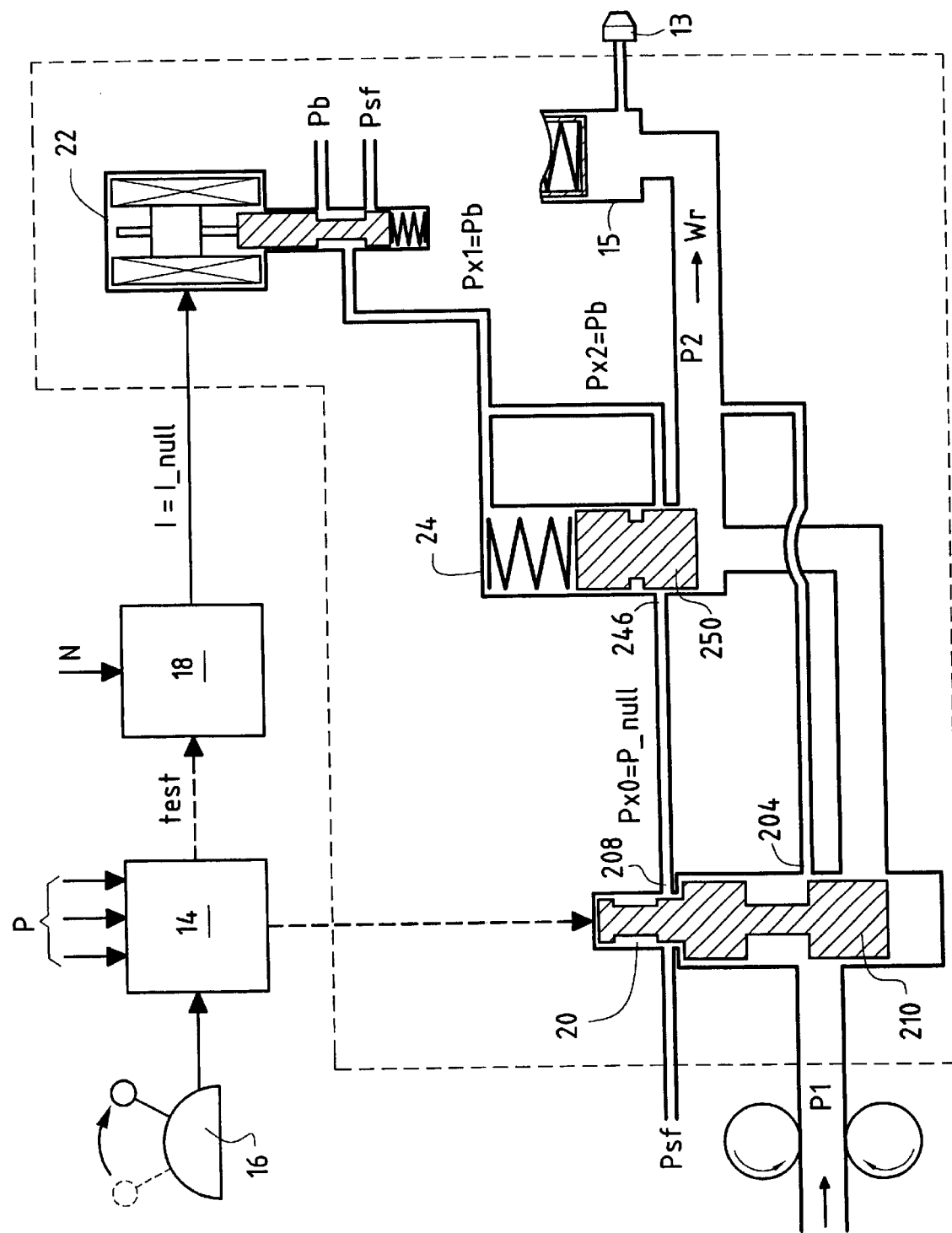
FIGS. 4A and 4B are views similar to FIGS. 1A and 1B, in a position for unlocking protection.
Figure 4B:
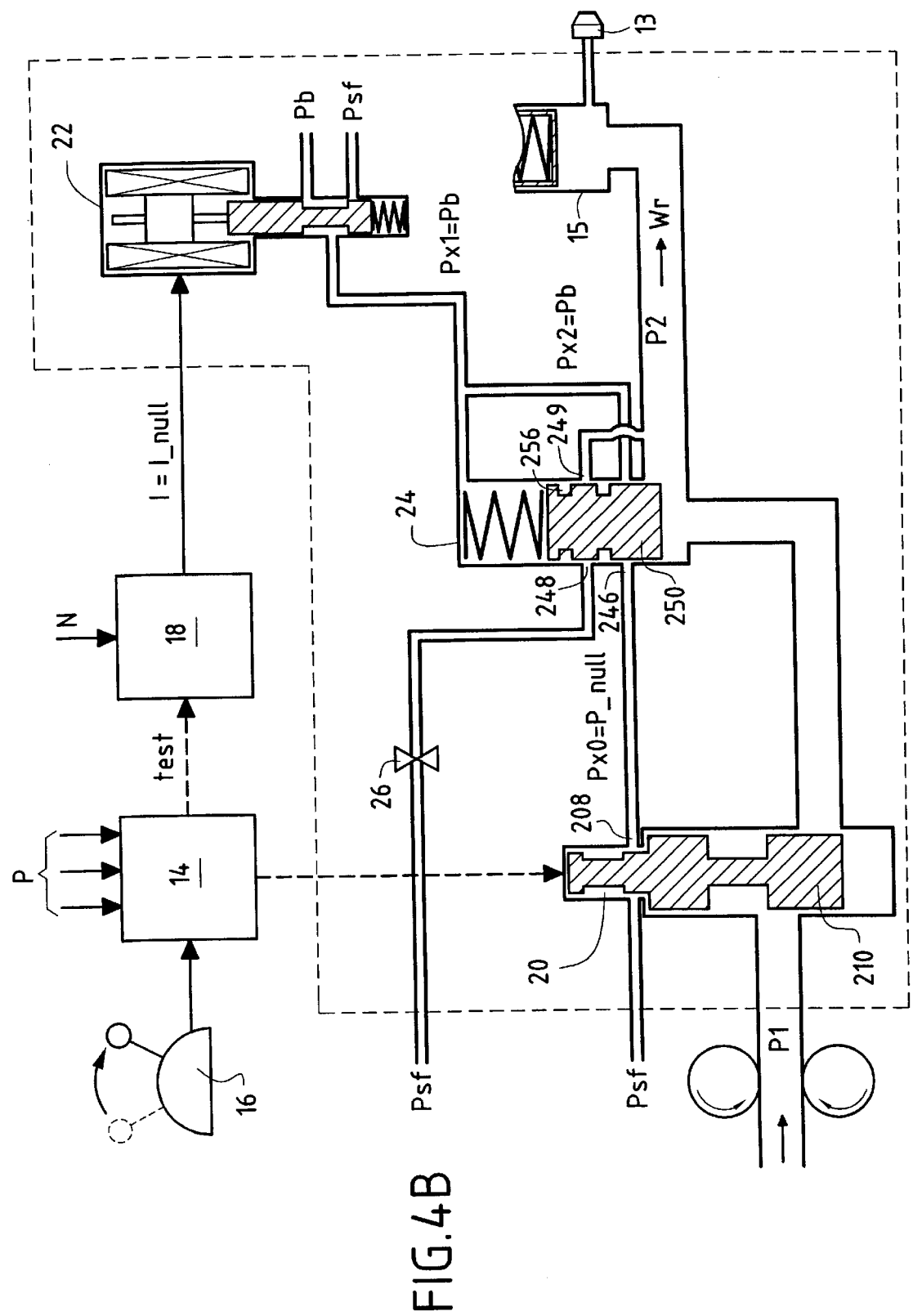

FIGS. 4A and 4B show the state of the injection system in a position after the protection action has been unlocked.

If the pilot brings the throttle lever 16 back towards an engine idling position and the entire control loop between the throttle lever and the metering valve is operating normally (i.e. in particular the electronic circuit 14 for regulating the engine is operating normally), then the metering element returns to a position corresponding to idling in which communication between the second utilization outlet 208 of the metering valve 20 and the first feed orifice 246 of the excess speed valve 24 is interrupted. The signal (Px0) then drops to (P_null), and since the signal (Px1) is equal to (Pb), the sum of (Px1) plus (P_null) becomes equal to (Pb) thus causing the excess speed valve to open. This unlocks the valve and the turbomachine is operating under normal idling conditions Wr<Wps with the pressures being in the following states:

(Px1)=(Px2)=(Pb) and (Px0)=(P_null)

Thus, in the event of excess speed, the pilot is no longer obliged, as in the past, to switch off the aircraft engine in order to lift excess speed protection. The pilot need only bring the engine down to idling speed. The considerable potential danger that results from an in-flight engine stoppage is thus avoided.

It should also be observed that the proposed configuration of the system for providing protection against excess speed lends itself well to testing proper operation of the excess speed valve both on starting and on stopping the engine.

Thus, during a starting sequence, the electronic circuit 18 for detecting excess speed can send a close order to the excess speed valve (I)≠(I_null) on an instruction from the control circuit 14. The first hydraulic signal from the solenoid valve (Px1) then becomes (Psf) and the excess speed valve 24 closes. The metering valve 20 is then in a restart flow rate position which is less than or equal to the idling flow rate. The locking signal (Px2) is zero. Once this startup test has terminated, the signal becomes zero (I)=(I_null), (Px1) becomes equal to (Pb) and the excess speed valve opens.

Similarly, when the pilot switches off the engine by acting on the lever 16, the metering valve 20 goes towards its closing abutment position so as to shut off communication via the second slot 214 and (Px0)=(P_null). As the HP speed falls off, the electronic circuit 18 for detecting excess speed sends a signal to test closure of the excess speed valve, thus returning to a sequencing of states identical to the case which applies when testing on starting.

What is claimed is:

1. A protection system for providing a turbomachine with protection against excess speed, in which machine a speed of rotation is controlled by a throttle control lever acting via an electronic control circuit, said system comprising:

means adapted to limit a fuel feed of the turbomachine to a predetermined fixed flow rate Wps when the speed of rotation exceeds an authorized maximum speed;

means adapted to maintain the fuel feed at the predetermined fixed flow rate Wps while the speed of rotation drops below the authorized maximum speed; and means adapted to return the fuel feed to a flow rate Wr corresponding to an idling speed when the throttle control lever issues an idling command via the electronic control circuit.

2. A protection system according to claim 1, wherein said means adapted to limit the fuel feed to the predetermined fixed flow rate Wps comprise:

an electronic circuit adapted to detect excess speed and configured to produce an electrical signal whenever the speed of rotation of the turbomachine exceeds the authorized maximum speed;

an excess speed solenoid valve connected to said electronic circuit and configured to deliver a first hydraulic signal under the control of said electrical signal; and an excess speed valve whose position is controlled by said first hydraulic signal to act by a metering valve to which said excess speed valve is connected so as to cause the flow rate of fuel to decrease until the flow rate reaches the predetermined fixed flow rate Wps.

3. A protection system according to claim 2, wherein said metering device is adapted to deliver via a utilization outlet the predetermined fixed flow rate Wps to the turbomachine.

4. A protection system according to claim 2, wherein said excess speed valve is adapted to deliver via a utilization orifice the predetermined fixed flow rate Wps to the turbomachine.

5. A protection system according to claim 2, wherein said excess speed solenoid valve is adapted to deliver said first hydraulic signal that corresponds to a low pressure Pb when the speed of rotation of the turbomachine is less than the authorized maximum speed, and to a higher pressure Psf when the speed of rotation exceeds the authorized maximum speed.

6. A protection system according to claim 5, wherein said excess speed solenoid valve is adapted to receive said higher pressure Psf that is equal to a high pressure P1 from a high pressure fuel injection pump.

7. A protection system according to claim 5, wherein said means adapted to maintain the fuel feed at the predetermined fixed flow rate Wps is adapted to utilize a second hydraulic signal set to said higher pressure Psf and added to said first hydraulic signal to move a hydraulic slider of said excess speed valve against a spring to maintain the fuel feed at the predetermined fixed flow rate Wps while the speed of rotation of the turbomachine drops below the authorized maximum speed.

8. A protection system according to claim 7, wherein said second hydraulic signal is obtained from a hydraulic control signal generated via said metering valve from said higher pressure Psf.

* * * * *